March 5, 1957
A. F. PITYO
2,784,297
METHOD OF AND APPARATUS FOR FORMING AND WELDING
PINS TO ONE OR BOTH SIDES OF A METAL STRIP
Filed May 20, 1955
2 Sheets-Sheet 2
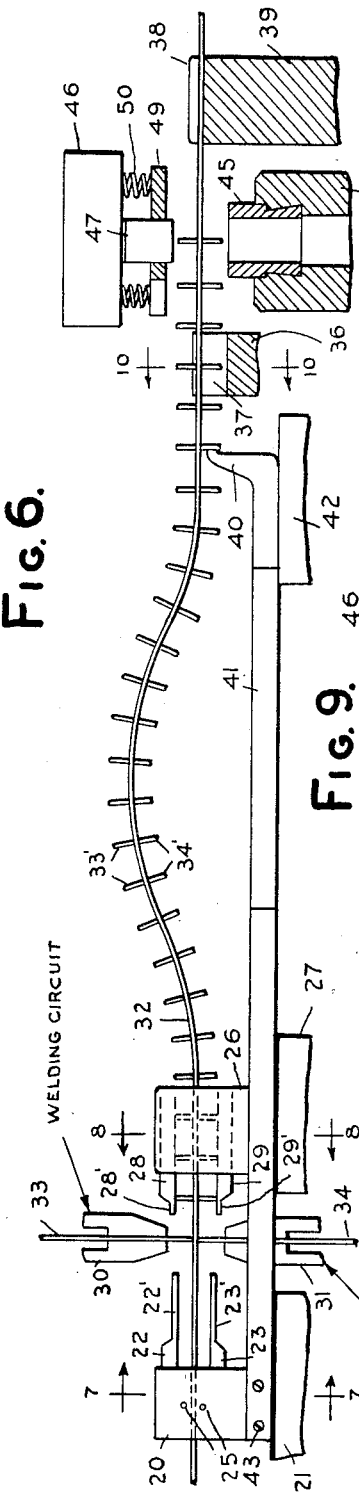
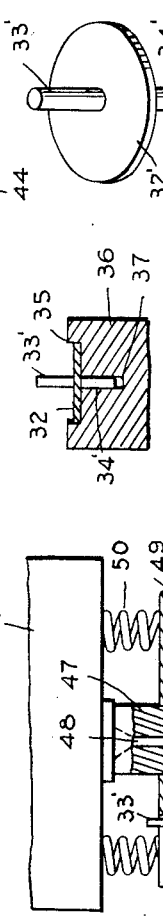
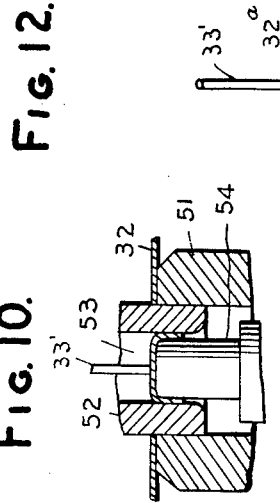
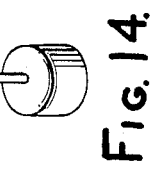
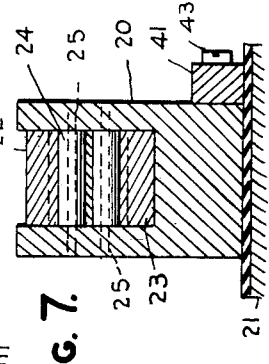
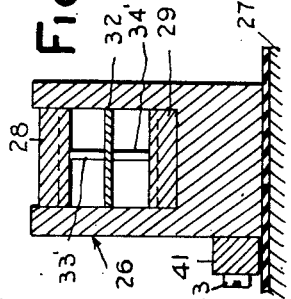
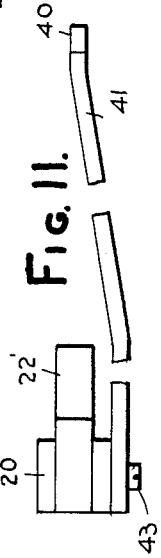
INVENTOR
ALBERT F. PITYO
BY
ATTORNEY

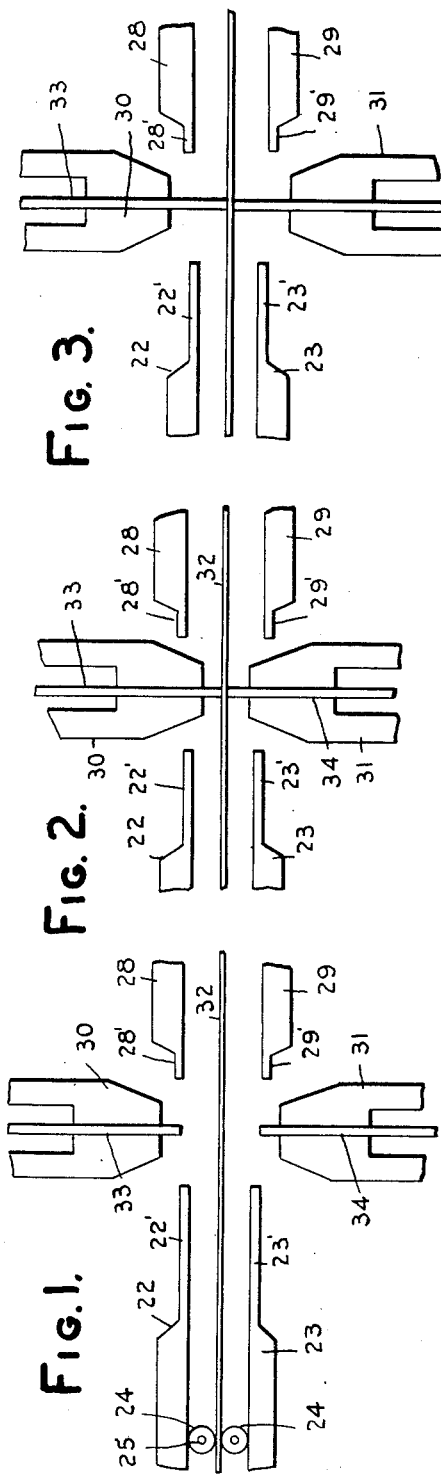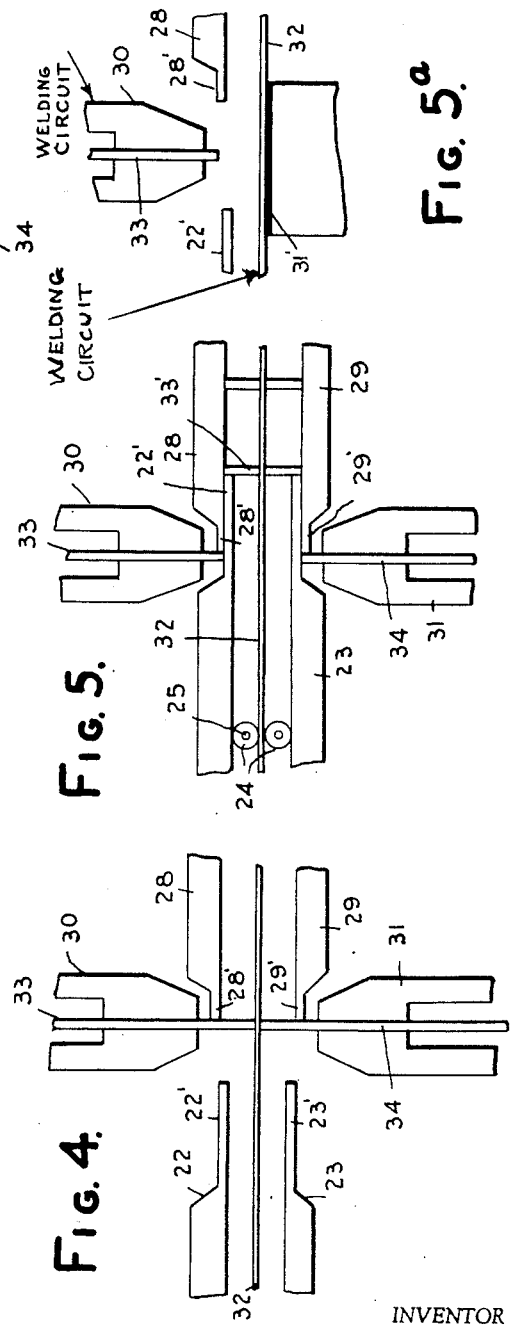

United States Patent Office 2,784,297
Patented Mar. 5, 1957

2,784,297

METHOD OF AND APPARATUS FOR FORMING AND WELDING PINS TO ONE OR BOTH SIDES OF A METAL STRIP

Albert F. Pityo, Cedar Grove, N. J.

Application May 20, 1955, Serial No. 510,000

13 Claims. (Cl. 219—78)

My invention relates to a method of and apparatus for forming and welding pins to one or both sides of a metal strip or ribbon.

An important object of the invention is to provide means for feeding wires into contact with the opposite faces of a metal strip, welding the wires to the metal strip and then severing the wires at points spaced from the metal strip, to produce the attached pins.

A further object of the invention is to effect the longitudinal indexing of the metal strip to space the attached pins, by severing the last produced pins and shifting the same to index the strip.

A further object of the invention is to provide means to stamp the article from the metal strip at a point remote from the welding point.

A further object of the invention is to provide means for welding pins upon one or both sides of the metal strip and spacing the same longitudinally of the metal strip.

A further object of the invention is to provide the indexing of the metal strip as a part and continuation of the severing step.

A further object of the invention is to provide apparatus which may be employed in the practice of the method.

Other objects and advantages of the invention will be apparent during the course of the following description.

In the accompanying drawings forming a part of this application and in which like numerals are employed to designate like parts throughout same, Figure 1 is a side elevation, partly diagrammatic, showing the elements in the position that they assume prior to the starting of the first step in the method, Figure 2 is a similar view, illustrating the completion of the first step of the method, showing the welding jaws in the inner position and the severing jaws in the outer position and the welding occurring, Figure 3 is a similar view illustrating the second step in the method showing the welding jaws in the outer position to clear the severing jaws which are still in the outer position, Figure 4 is a similar view illustrating a portion of the third step of the method, the welding jaws being in the open position, the leading severing jaws in the inner position and the trailing severing jaws in the outer position, Figure 5 is a similar view showing the parts adjusted for the completion of the third step, the welding jaws being in the inner position and the leading and trailing severing jaws being both in the inner position, Figure 5a is a modification of the apparatus, shown in Figure 1, for welding pins to one side only of the metal strip, Figure 6 is a side elevation of the apparatus employed in the practice of the method, parts in section, Figure 7 is a transverse vertical section taken on line 7—7 of Figure 6, Figure 8 is a similar view taken on line 8—8 of Figure 6, Figure 9 is an enlarged central vertical longitudinal section through the stamping device, Figure 10 is a transverse section taken on line 10—10 of Figure 6, Figure 11 is a plan view of the indexing arm, Figure 12 is a perspective view of the completed product, produced from the stamping device shown in Figure 9, Figure 13 is a similar view through a modified form of stamping device, Figure 14 is a perspective view of the completed product shown produced by the stamping device of Figure 13.

The apparatus comprises a carriage 20, vertically arranged and slidably mounted upon a stationary support 21, to reciprocate horizontally in a straight line. The carriage 20 may be formed of insulating material or it may be formed of metal and insulated from the support 21. Rigidly mounted within the carriage 20 are vertically spaced upper and lower trailing severing jaws 22 and 23, formed of metal, and having forwardly projecting reduced elongated blades 22' and 23' respectively. A pair of vertically spaced rollers 24 are mounted within the carriage 20, between the trailing jaws 22 and 23 and are carried by pins or shafts 25. The numeral 26 designates a companion leading carriage spaced forwardly from the trailing carriage 20. The leading carriage 26 is mounted to reciprocate in a horizontal straight line upon a stationary support 27. The carriage 26 may be formed of insulating material or it may be formed of metal and insulated from the support 27. Rigidly mounted within the carriage 26 are upper and lower leading severing jaws 28 and 29 having reduced blades 28' and 29', as shown. Any suitable means may be employed to reciprocate the carriages 20 and 26, in timed order, or they may be reciprocated by hand.

Mounted between the carriages 20 and 26 and their severing jaws are pairs of upper and lower vertical welding jaws 30 and 31, which are to be insulated from the severing jaws and associated elements and electrically connected with the opposite sides of a suitable welding circuit. These pairs of jaws are to be reciprocated vertically in straight lines and may be moved by any suitable means or by hand.

The numeral 32 designates a metal ribbon, which passes between the rollers 24 and between the severing jaws 22 and 23 and the severing jaws 28 and 29, and is longitudinally indexed, in a manner to be described. The upper pair of welding jaws 30 engage a wire 33 and the lower jaws 31 engage a wire 34 and are moved into and out of clamping engagement therewith. The metal strip 32 may be formed of steel, nickel, or any other suitable metal or alloy, and the wires 33 and 34 may be formed of steel, nickel or any other suitable metal or alloy.

The metal strip 32, when passing between the severing jaws 28 and 29, causes the pins 33' and 34' to slidably contact with the severing jaws 28 and 29 and be guided thereby. The metal strip 32 also passes through a recess 35, formed in a stationary guide 36, having a longitudinal slot 37 to receive the pins 34'. The metal strip also passes through a recess 38 formed in a stationary guide 39.

The metal strip 32 has its leading portion intermittently fed longitudinally or indexed by means of a pawl 40, rigidly secured to a horizontal arm 41, the leading portion of which is offset inwardly. The leading end of this arm 41 is slidably mounted upon a stationary support 42. The rear end of the arm 41 is arranged upon the outer side of the carriage 20 and is rigidly secured thereto, as shown at 43. It is thus seen that the pawl 40 is arranged to engage behind each lower pin 34' and to shift or index the strip 32 forwardly a selected distance whereby the pins are equidistantly spaced. A certain amount of slack is provided in the intermediate portion of the strip 32.

Arranged between the stationary supports 36 and 39 is a vertically movable tubular carrier 44, holding a tubular die 45 and this die may be lowered to an elevation beneath the path of travel of the pins 34', Figure 6, and then raised to an elevated position, to contact with the metal strip 32, Figure 9. Arranged above the metal strip 32 and between the supports 36 and 39 is an upper carrier 46, having a tubular punch 47 rigidly secured thereto and having an opening 48 which will receive the upper pin 33'. The carrier 46 supports a clamping ring 49, slidably mounted upon the punch 47 and urged downwardly by springs 50.

In Figure 5a, the lower severing jaws 23 and 29 are omitted and a stationary insulating support engages the lower face of the metal strip 32. The lower welding jaws 31 are of course omitted. This device serves to weld pins to the upper surface of the metal strip only.

In Figure 13, a tubular die 51 is provided corresponding to the die 45 and adapted to be mounted upon the carrier 44. This die 51 may be permanently held with its upper end slidably contacting with the metal strip 32, but may be raised and lowered as described in connection with the die 45. The numeral 52 designates a tubular punch, for movement into the tubular die 45, and having a bore 53. Mounted within the bore of the tubular die 45 is an inner forming die 54, adapted to enter the bore 53. The punch device shown in Figure 13 is used in connnection with a metal strip having the pins 33' welded to the upper side only.

In the practice of the method in connection with the apparatus shown in Figures 1 to 12 inclusive, the metal strip 32 is arranged horizontally within the carriages 20 and 26 and upon the supports 36 and 39 with an upwardly bulging slack provided in the metal strip, as shown. The welding jaws 30 and 31 are in the outer position at the starting of the first step in the method, Figure 1, and these welding jaws now have clamping engagement with the wires 33 and 34. The trailing severing jaws 22 and 23 are in the outer position and the leading severing jaws 28 and 29 are in the outer position. The two sets of severing jaws now remain stationary while the welding jaws 30 and 31 move to the inner position, Figure 2, and bring the ends of the wires 33 and 34 into contact with the metal strip 32, and the welding circuit is closed for a selected timed interval and the wires are properly welded to the metal strip. The wires have their butt ends in alignment with each other and these butt ends are pressed against the opposite faces of the metal strip, so that suitable pressure is provided for effecting the welding operation. The butt ends of the wires 33 and 34 are in alignment, as stated, and the end portions of the wires are at right angles to the face of the metal strip 32. This completes the first step in the method and the butt ends of the wires are securely welded to the metal strip. The jaws 30 and 31 are now moved to the outer position, sliding along the wires 33 and 34 and again having clamping engagement with the wires at the end of the outer movement of the jaws 30 and 31. The severing jaws are also now in the outer position. The portions of the wires 33 and 34 next to the metal strip which have been welded thereto are now exposed for the severing operation, and Figure 3 may be regarded as illustrating the second step in the method. As shown in Figure 4, the leading carriage 26 is now shifted rearwardly, shifting the severing jaws 28 and 29 rearwardly so that the severing blades 28' and 29' contact with the leading sides of the wires 33 and 34 and the carriage 26 is now brought to rest. The leading jaws 28 and 29 are now held against movement. The trailing carriage 20 is now shifted forwardly moving the trailing severing jaws 22 and 23 forwardly. The blades 22' and 23' first contact with the wires 33 and 34 while they are engaging the stationary blades 28' and 29' and the blades 22' and 23' first sever the wires at the vertical line of severing, forming the pair of pins 33' and 34' which are at the longitudinal center of the strip 32, at right angles thereto and in alignment with each other. While the blades 28' and 29' still remain stationary, the blades 22' and 23' move forwardly beyond the vertical line of severing for a selected distance, for defining the longitudinal distance between the pairs of pins 33' and 34'. The blades 22' and 23' in this forward movement continue to engage the trailing pair of pins 33' and 34' and feed them forwardly, which indexes the metal strip 32 longitudinally. It is thus seen that the blades 28' and 29' and 22' and 23' serve to sever the wires at the vertical line of severing and the continued forward movement of the blades 22' and 23' indexes the metal strip longitudinally and accordingly longitudinally spaces the pairs of pins 33' and 34'. When the strip 32 is indexed forwardly, blades 28' and 29' may remain stationary. The severing and indexing step being completed, Figures 4 and 5, the severing jaws 22 and 23 and 28 and 29 are shifted to the outer positions, Figure 1, and the pairs of welding jaws have clamping engagement with the wires 33' and 34' and the parts are in the relative position for the completion of another cycle of operation.

The several pairs of wires 33' and 34' are thus welded to the metal ribbon 32 and are longitudinally spaced thereon and the metal ribbon is indexed step by step, forwardly, Figure 6. The blades 22' and 23' effect the longitudinal indexing of the trailing portion of the ribbon and the leading portion of the ribbon is indexed by the pawl 40 which engages successively behind each pin 34'. The pawl 40 is moved simultaneously and in unison with the trailing carriage 20 since it is secured to the arm 41, which is attached to the carriage. The metal ribbon operates within the guides 36 and 39. During a dwell of the metal strip 32, the tubular die 45 is elevated and the tubular punch 47 lowered, Figure 9, and a circular disc 32' is stamped from the metal strip 32, Figure 12, having the pins 33' and 34' welded thereto. These pins are arranged upon opposite faces of the circular disc 32' and are concentric with the disc 32' and with each other and their butt ends are in alignment. This is one of the products which it is desired to make.

It may be desired to weld the pins 33' to the upper face of the metal strip 32 only, in which event the severing jaws 23 and 29 and the lower jaws 31 will be omitted and a stationary insulating support 31' will be arranged beneath and in contact with the ribbon 32. The upper jaws 30 will now bring the wire 33 into contact with the upper face of the ribbon 32 and the blades 22' and 28' have the same mode of operation as explained in connection with Figure 6, and the wire 33 is severed and the blade 22' pushes the pin 33 forwardly to longitudinally index the ribbon.

This ribbon having the upper pins 33' welded thereto may be passed over the die 45 and the circular disc 32' will be stamped therefrom in the same manner and the pin 33' is welded thereto without the pin 34'.

If it is desired to form the disc 32' into a cup-shaped element 32a, the punch device shown in Figure 13 is employed. The metal strip with the pins 33' welded thereto are passed over the die 51 and the tubular punch 52 descends, stamping the disc from the metal strip and forming the same about the inner die 54 to produce the cup-shaped member 32a. The tubular punch 52 may now be raised and the tubular die 51 lowered with the inner die 54 remaining stationary, at which time the cup-shaped member 32a may be removed.

Having thus described my invention, I claim:

1. A method of securing pairs of pins to an elongated metal strip, comprising supporting the elongated metal strip for longitudinal indexing, arranging metal wires upon opposite sides of the metal strip, moving the ends of the wires into contact with opposite faces of the metal strip, electrically welding the ends of the wires to the metal strip, arranging means including severing devices upon opposite sides of the metal strip and spaced therefrom and moving the severing devices longitudinally of the metal strip to first sever the wires for providing pins secured to the metal strip and movable with the metal strip and continuing the movement of the severing devices longitudinally of the metal strip while engaging said pins to bodily shift the pins in a direction longitudinally of the metal strip to longitudinally index the metal strip, and then repeating the cycle of steps for any suitable number of times for securing additional pairs of pins to the metal strip.

2. A method of securing pairs of pins to an elongated metal strip, comprising supporting the elongated metal strip for longitudinal indexing, arranging metal wires upon opposite sides of the metal strip, holding the ends of the wires at a fixed point with respect to the metal strip and arranging such ends in substantial alignment, moving the ends of the wires into contact with opposite faces of the metal strip, electrically welding the ends of the wires to the metal strip, arranging means including severing devices upon opposite sides of the metal strip and spaced therefrom and moving the severing devices longitudinally of the metal strip to first sever the wires for providing pins secured to the metal strip and movable with the metal strip and then continuing the movement of the severing device longitudinally of the metal strip while engaging said pins to bodily shift the pins in a direction longitudinally of the metal strip to longitudinally index the metal strip, and then repeating the cycle of steps any suitable number of times for securing additional pairs of pins to the metal strip.

3. A method of securing pairs of pins to a metal strip, comprising arranging end portions of metal wires upon opposite sides of the metal strip, moving the end portions of said wires into contact with the metal strip, welding said end portions to the metal strip, severing the wires at points spaced from the metal strip by means including blades shiftable in a direction longitudinally of the metal strip to form attached pins, continuing the longitudinal shifting movement of said blades beyond the point of severing to shift said attached pins in a direction longitudinally of the metal strip to cause said attached pins to index the metal strip longitudinally, and then repeating the steps of the method for securing additional pins to the metal strip.

4. A method of securing pairs of pins to a metal strip, comprising arranging end portions of metal wires upon opposite sides of the metal strip while holding such end portions at substantially right angles to the faces of the metal strip, moving the ends of such end portions into contact with the opposite faces of the metal strip, welding the ends of the end portions to the metal strip, arranging outer leading severing blades upon opposite sides of the metal strip and spaced therefrom and substantially parallel to the metal strip and upon the leading side of said end portions, arranging inner trailing severing blades upon opposite sides of the metal strip and spaced therefrom and substantially parallel therewith and upon the trailing side of said end portion, moving the leading blades rearwardly longitudinally of the metal strip until they contact with said end portions and then holding the leading blades stationary, moving the trailing blades forwardly longitudinally of the metal strip into engagement with said end portions and then beyond said end portions and between the leading blades to sever said end portions and form attached pins, then continuing the forward movement of the trailing blades to thereby cause the trailing blades to shift the last-named severed attached pins forwardly and thereby cause the last-named attached pins to longitudinally index the metal strip forwardly, and then repeating the steps of the method for securing additional pairs of pins to the metal strip.

5. A method of severing end portions of wires arranged upon opposite sides of a metal strip and secured thereto, comprising arranging outer leading blades upon opposite sides of the metal strip and spaced therefrom and upon the leading side of said end portions, arranging inner trailing blades upon the opposite sides of the metal strip and spaced therefrom and upon the trailing side of said end portions, moving the leading blades rearwardly longitudinally of the metal strip until they contact with said end portions, moving the trailing blades forwardly longitudinally of the metal strip into engagement with said end portions and between the leading blades to sever said end portions, and then continuing the forward movement of the trailing blades so that the trailing blades engage the severed pins and shift them longitudinally of the metal ribbon and index the metal ribbon forwardly.

6. A method of severing the end portion of a wire arranged upon one side of a metal strip and secured thereto and indexing the metal strip longitudinally, comprising arranging an outer leading blade upon the same side of the metal strip with said end portion and spaced from the metal strip and disposed upon the leading side of said end portion, arranging an inner trailing blade upon the same side of the metal strip with said end portion and spaced from the metal strip and disposed upon the trailing side of said end portion, moving the trailing blade forwardly longitudinally of the metal strip and inwardly of the leading blade for shearing action therewith to sever said end portion, and then continuing the forward movement of the trailing blade while it engages the severed pin to shift the severed pin longitudinally of the metal strip and effect the longitudinal indexing of the metal strip.

7. The apparatus for attaching pairs of pins to the opposite sides of an elongated metal strip, comprising leading and trailing carriages having guide means to receive the metal strip so that it may be longitudinally indexed, means for supporting said carriages so that they may be shifted longitudinally of the metal strip, electrode devices arranged upon opposite sides of the metal strip and disposed between the carriage to move the ends of metal wires into contact with the opposite faces of the metal strip, said electrode devices being included in a welding circuit, outer leading blades secured to the leading carriage and arranged upon opposite sides of the metal strip, said outer leading blades being substantially parallel with said metal strip, inner trailing blades secured to the trailing carriage and arranged upon opposite sides of the metal strip, said inner trailing blades being substantially parallel with said metal strip, the inner trailing blades moving inwardly of and coacting with the outer leading blades for severing the wires when the trailing carriage is moved forwardly longitudinally of the metal strip to form severed pins and contacting with the severed pins to shift them forwardly to longitudinally index the metal strip.

8. Apparatus for attaching pairs of pins to the opposite sides of an elongated metal strip, comprising a leading support, a trailing carriage, said support and carriage having guide means to receive the metal strip so that it may be longitudinally indexed, means for supporting the trailing carriage so that it may be shifted longitudinally of the metal strip, electrode devices arranged upon opposite sides of the metal strip and disposed between the support and the carriage to move ends of metal wires into contact with opposite faces of the metal strip, said electrode devices being included in a welding circuit, outer leading blades secured to the support for engagement with said wires said outer leading blades being arranged substantially parallel with said metal strip, inner trailing blades secured to the trailing carriage and arranged upon opposite sides of the metal strip, said inner trailing blades being arranged substantially parallel with the metal strip, the inner trailing blades moving inwardly of and coacting with the leading trailing blades for severing the wires when the trailing carriage is moved forwardly longitudinally of the metal strip to form severed pins and said inner trailing blades contacting with the severed pins to shift them forwardly to longitudinally index the metal strip.

9. Apparatus for attaching pins to the side of an elongated metal strip, comprising a leading support, a trailing carriage, said support and carriage having means for guiding the metal strip so that it may be longitudinally indexed, means for supporting the trailing carriage so that it may be shifted longitudinally of the metal strip, electrode means engaging a metal wire to shift its end into contact with the metal strip, said electrode means being included in a welding circuit, an outer leading blade secured to the support to contact with the wire, said outer leading blade being substantially parallel with the metal strip, an inner trailing blade arranged substantially parallel with the metal strip and secured to the trailing carriage and moving inwardly of and coacting with the leading blade for severing the wire when the carriage is moved forwardly to form a severed pin and said inner trailing blade contacting with the severed pin to shift it forwardly and thereby causing such severed pin to longitudinally index said metal strip.

10. A method of securing pins to metal parts, comprising supporting and guiding an elongated metal strip for longitudinal indexing, arranging metal wires upon opposite sides of the metal strip at a fixed point, moving in succession the ends of such wires inwardly in opposite directions into contact with the opposite faces of the metal strip while holding such ends in substantial alignment and producing pressure upon the opposite faces of the metal strip by the movement of the wires toward the metal strip, welding in succession the ends of the wires in contact with the opposite faces of the metal strip to thereby attach the wires to such faces, arranging forward outer and trailing inner blades upon the forward and trailing sides of the wires and upon opposite sides of and spaced from the metal strip and holding the same substantially parallel with the metal strip, moving the trailing inner blades forwardly in succession in a direction longitudinally of the metal strip so that the trailing inner blades pass inwardly of the outer leading blades and first sever the wires after such wires have been welded to the metal strip and at points spaced from the metal strip to produce pins attached to the metal strip, and then continuing the forward movement of the trailing inner blades to cause such blades to contact with the severed pins and to shift them forwardly longitudinally of the metal strip and thereby causing such pins to longitudinally index the metal strip after each welding step.

11. A method of securing pins to metal parts, comprising supporting and guiding an elongated strip for longitudinal indexing, arranging metal wires upon opposite sides of the metal strip at a fixed point, moving the ends of such wires inwardly in opposite directions to contact with the opposite faces of the metal strip while holding such ends in substantial alignment and producing pressure upon the opposite faces of the metal strip by the movement of the wires toward the metal strip, welding the ends of the wires in contact with the opposite faces of the metal strip to thereby attach the wires to such faces, arranging forward outer and trailing inner blades upon the forward and trailing sides of the wires and upon opposite sides of and spaced from the metal strip and holding the same substantially parallel with the metal strip, moving the trailing inner blades forwardly in a direction longitudinally of the metal strip so that the trailing inner blades pass inwardly of the outer leading blades and first sever the wires after such wires have been welded to the metal strip and at points spaced from such metal strip to produce pins attached to the metal strip, then continuing the forward movement of the trailing inner blades to cause such blades to contact with the severed pins and to shift them forwardly longitudinally of the metal strip and thereby cause such pins to longitudinally index the metal strip after each welding step, and then repeating in succession any suitable number of cycles of said steps.

12. Apparatus for attaching pins formed from wire to the side of an elongated metal strip, comprising means for supporting the metal strip, a trailing carriage, a leading support, means for supporting the trailing carriage so that it may be shifted longitudinally of the metal strip, means to move the end portion of the wire into contact with the metal strip and weld the wire to the metal strip, an outer leading blade secured to the support to contact with the wire, an inner trailing blade secured to the carriage and coacting with the leading blade for severing the wire when the carriage is moved forwardly and contacting with the formed pin to move it forwardly for indexing the strip upon the movement of the inner trailing blade beyond the severing point.

13. The method of securing pins to a metal strip for producing metallic elements having pins secured thereto, comprising supporting a metal strip so that it may be indexed longitudinally across a welding station and also across a stamping station which is spaced from the welding station, forming a slack in the metal strip between said stations, arranging a wire upon one side of the metal strip at the welding station and pressing the end portion of such wire into contact with the metal strip, welding the end portion of the wire to the metal strip, severing the wire at a point spaced from the metal strip for forming an attached pin, then indexing the metal strip to the next longitudinal position by applying pressure in a direction longitudinally of the metal strip to the formed pin, then repeating the steps of the method for a plurality of cycles whereby a plurality of pins are secured to the metal strip in spaced relation, and applying pressure in succession to the spaced pins which are near the stamping station to shift the pins in a direction longitudinally of the metal strip and index that portion of the strip near the stamping station for locating each pin in succession at the stamping station.

References Cited in the file of this patent

UNITED STATES PATENTS

| | | |
|---|---|---|
| 1,119,553 | Vaughan | Dec. 1, 1914 |
| 1,999,617 | Randall | Apr. 30, 1935 |
| 2,028,996 | Santier | Jan. 28, 1936 |
| 2,251,094 | Witter | July 28, 1941 |
| 2,339,884 | Schlumpf | Jan. 25, 1944 |
| 2,584,189 | Dalin | Feb. 5, 1952 |